United States Patent
Tsubaki

(10) Patent No.: US 7,238,029 B2
(45) Date of Patent: Jul. 3, 2007

(54) POWER-SUPPLY DEVICE

(75) Inventor: Akira Tsubaki, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/364,076

(22) Filed: Mar. 1, 2006

(65) Prior Publication Data
US 2006/0199416 A1    Sep. 7, 2006

(30) Foreign Application Priority Data
Mar. 3, 2005    (JP)    ............... 2005-058484

(51) Int. Cl.
*H01R 33/00*    (2006.01)
(52) U.S. Cl. ............ 439/34; 439/501; 174/72 A; 296/65.13
(58) Field of Classification Search ........... 439/34, 439/501; 174/72 A; 307/10.1; 296/65.13
See application file for complete search history.

(56) References Cited

U.S. PATENT DOCUMENTS

| 5,441,416 | A * | 8/1995 | Gajewski et al. | 439/32 |
| 6,492,592 | B1 * | 12/2002 | Murofushi et al. | 174/72 A |
| 6,575,760 | B2 * | 6/2003 | Doshita et al. | 439/34 |
| 6,682,353 | B2 * | 1/2004 | Bigotto | 439/34 |
| 6,811,404 | B2 * | 11/2004 | Doshita et al. | 439/34 |
| 6,997,499 | B2 * | 2/2006 | Tsubaki et al. | 296/65.13 |
| 7,057,110 | B2 * | 6/2006 | Tsubaki et al. | 174/72 A |
| 2003/0119338 | A1 * | 6/2003 | Bigotto | 439/34 |
| 2005/0035622 | A1 * | 2/2005 | Tsubaki et al. | 296/65.13 |
| 2006/0021781 | A1 * | 2/2006 | Tsubaki et al. | 174/72 A |

FOREIGN PATENT DOCUMENTS

| JP | 11-342807 | 12/1999 |
| JP | 2004-48977 | 2/2004 |

* cited by examiner

*Primary Examiner*—Gary F. Paumen
(74) *Attorney, Agent, or Firm*—Armstrong, Kratz, Quintos, Hanson & Brooks, LLP

(57) ABSTRACT

There is provided a power-supply device includes: a case receiving a curved wire harness; a guide rail mounted on the case; a slider mounted slidably on the guide rail, through which the wire harness being routed out from the case; an urging member having a resilient part mounted on the slider, and a long rack. The long rack alternately has crests and troughs, and slidably engaged with the resilient part of the urging member. Preferably, the long rack is mounted on the guide rail, and the urging member is mounted on a slidable engaging part of the slider for engaging with the guide rail. Preferably, the urging member is slidably engaged with the slider.

6 Claims, 4 Drawing Sheets

POWER-SUPPLY DEVICE

CROSS REFERENCE TO RELATED APPLICATIONS

This application is based on Japanese Patent Application No. 2005-058484 filed in Japan Patent Office on Mar. 3, 2005, the contents of which are hereby incorporated by reference.

BACKGROUND OF THE INVENTION

1. Field of the Invention

The present invention relates to a power-supply device for constantly feeding electric power to a sliding door, a sliding seat of a vehicle or the like by a substantially U-shaped wire harness expanded and contracted with a movement of a slider in a case.

2. Description of the Related Art

FIG. 10 shows an embodiment of a conventional power-supply device 61 disclosed in FIG. 2 of Japanese Published Patent Document H11-342807.

This power-supply device 61 is used for a sliding door of a vehicle, and includes: a long case 63 for receiving a substantially U-shaped flat wire harness 62; a resilient reinforcing plate 64 mounted on an outer wall of the wire harness 62; a slider 65 disposed on a movable end of the wire harness 62; and a guide rail 66 engaging slidably with the slider 65.

The movable end of the wire harness 62 is connected to a connector of a wire harness 68 extending to a vehicle body through the slider 65. A fixed end of the wire harness 62 is connected to a wire harness 69 extending to a sliding door.

While the slider 65 is slid forward and backward along the guide rail 66 corresponding to opening and closing of the sliding door, the wire harness 62 is kept in the substantial U-shape, and expanded or contracted integrally with the slider 65 to absorb a stroke between opening and closing of the sliding door. Thus, electric power and signals are constantly fed from the vehicle body to various auxiliaries disposed on the sliding door.

Another embodiment (not shown) of the conventional constant power-supply device for a sliding door is, for example, disclosed in FIG. 1 of Japanese Published Patent Document 2004-48977.

In an interior of a synthetic resin made substantially semicircular protector of the conventional power-supply device, a metallic flat spring urging a wire harness routed in a curve shape urging upward, the supporting member made of synthetic resin and fixed to the flat spring stably supporting the wire harness, and a spring piece mounted on the supporting member contacting an inner wall of the protector prevent a noise caused by a roll of a supporting member.

However, in the power-supply device 61 described in Japanese Published Patent Document H11-342807, because the slider 65 has no noise protection mechanism, when the sliding door is fully opened, a vibration of a moving vehicle or a vibration of an engine of a stopping vehicle may produce resonance of the slider 65, so that the slider may rattle with the guide rail 66 of the case 63 to make a noise, and that the slider 65, the guide rail 66, and the like may be abraded. Particularly, when the synthetic resin made case 63 is molded relatively large, owing to a variation of size of the molded case 63, the case 63 may rattle harder with the slider 65 to increase the noise and the abrasion.

Further, when the sliding door is opened or closed and the slider 65 is moved along the guide rail 66, the rattle may cause the abrasion, and make a larger noise. Further, before the power-supply device 61 is mounted on a vehicle, the slider 65 may move freely depending on an attitude and a form of packaging of the transported power-supply device 61. Thereby, a troublesome work to return the slider 65 to a predetermined position may be generated.

Accordingly, an object of the present invention is to provide a power-supply device for preventing noise and abrasion caused by a rattle generated when a slider is moved and stopped, and regulating an unnecessary movement of the slider before the power-supply device is mounted.

SUMMERY OF THE INVENTION

In order to attain the object, according to the present invention, there is provided a power-supply device including: a case receiving a curved wire harness; a guide rail mounted on the case; a slider mounted slidably on the guide rail, through which the wire harness being routed out from the case; an urging member having a resilient part mounted on the slider; and a long rack alternately having crests and troughs, slidably engaged with the resilient part of the urging member.

According to the above, the wire harness is folded in a substantial U-shape, and extracted through the slider from the case. The slider is moved forward and backward along the guide rail in the case. As the slider is moved forward and backward, the wire harness is expanded and contracted. The resilient part of the urging member is resiliently slid integrally with the slider on the rack without rattle. When the slider is stopped, the resilient part is resiliently engaged with one of the troughs of the rack without rattle. Thereby, the slider is positioned and temporarily fixed.

Preferably, the long rack is mounted on the guide rail, and the urging member is mounted on a slidable engaging part of the slider for engaging with the guide rail.

According to the above, the slidable engaging part of the slider is slid along the guide rail without rattle, and the urging member is resiliently and slidingly contacted with the rack mounted on the guide rail.

Preferably, the urging member is slidably engaged with the slider.

According to the above, when the slider is stopped, the resilient part of the urging member is resiliently engaged with one of the troughs of the rack. When the slider is going to be moved, firstly, the slider is moved while the urging member is kept stopped relative to the rack until the slider pushes the urging member. Then, the urging member is moved integrally with the slider. When the slider is stopped again, even if the resilient member is moved onto around one of the crests of the rack, the resilient part presses strongly against a slope of the crest, so that counter force of the pressure moves the resilient part to an adjacent trough as the urging member is moved within an interior of the slider. Thereby, the resilient part of the urging member is stably positioned at the one of the troughs, and deformation of the resilient part by the crest is prevented.

Preferably, the urging member includes a base plate and the resilient part mounted on the base plate, and the slider includes a pair of guides. Further, the base plate is slidably engaged with a gap between the pair of guides of the slider.

According to the above, the resilient part is projected between the pair of guides. When the slider is stopped, the base plate of the resilient member is resiliently engaged with one of the troughs. When the slider is going to be moved, firstly, the slider is moved while the urging member is kept stopped relative to the rack until the slider pushes the urging member. Then, the urging member is touched on one of the guides and moved integrally with the slider. When the slider is stopped again, even if the resilient member is moved onto around one of the crests of the rack, the resilient part presses strongly against a slope of the crest, so that counter force moves the resilient part to an adjacent trough as the urging member is slid between the guides of the slider. Thereby, the resilient part of the urging member is stably positioned at the one of the troughs, and deformation of the resilient part by the crest is prevented.

Preferably, the resilient part is formed in a bent plate shape.

According to the above, when the resilient part is touched on one of the crests of the rack, the resilient part is largely bent inward to smoothly move over the crest. Particularly, when the resilient part is made in a bent plate shape supported at both ends thereof, the resilient part is hard to be flattened, and resiliency of the resilient part is maintained over a long period. Further, the resilient part is surely and smoothly slid from the one of the crests to the adjacent trough when the slider is stopped as described above.

Preferably, the crests and the troughs form a corrugated part of the rack body.

According to the above, the resilient part of the urging member is smoothly moved along the crests and troughs of the rack. Further, the resilient part is surely and smoothly slid from the one of the crests to the adjacent trough when the slider is stopped as described above.

These and other objects, features, and advantages of the present invention will become more apparent upon reading of the following detailed description along with the accompanied drawings.

DETAILED DESCRIPTION OF THE PREFERRED EMBODIMENTS

First Embodiment

Figure 1:
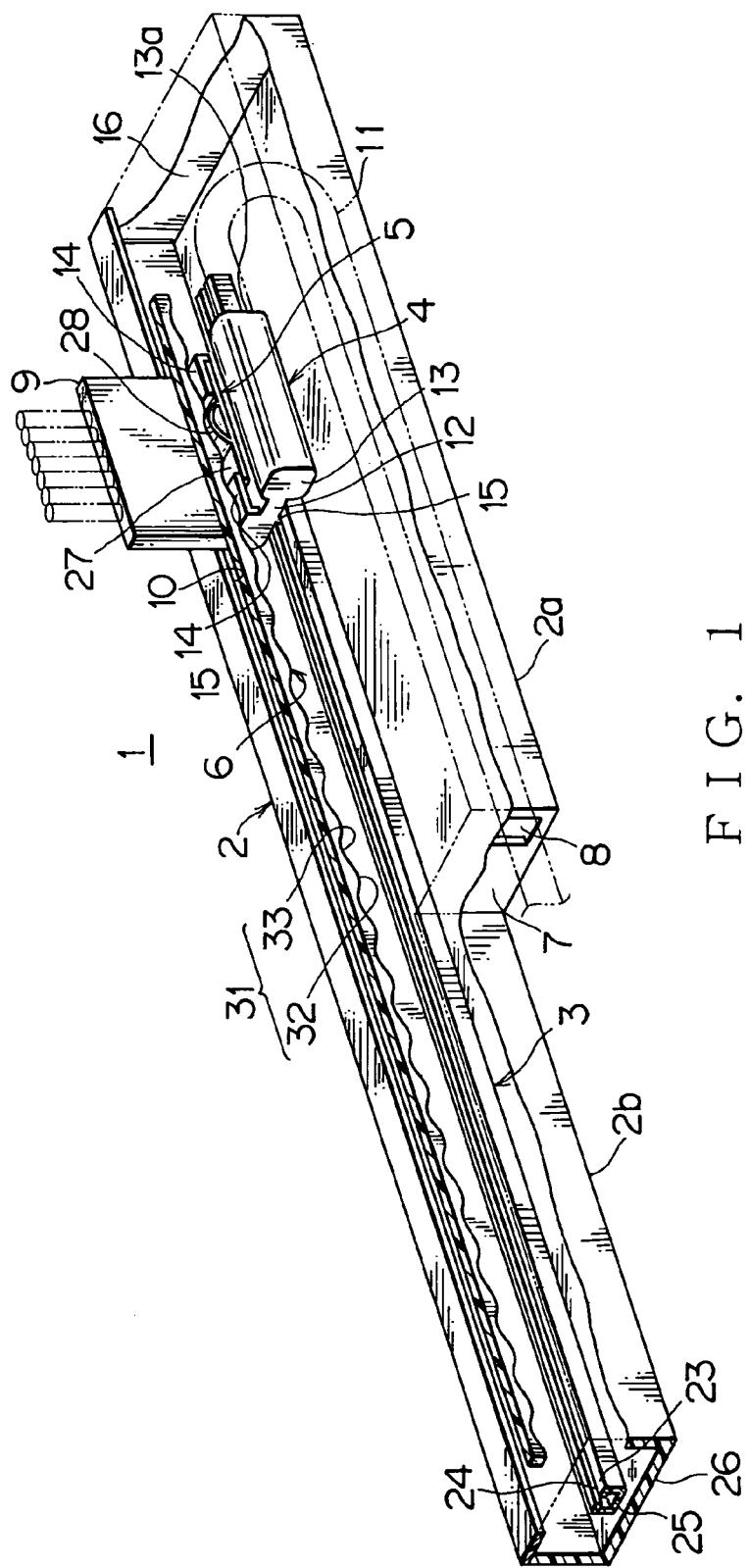
FIG. 1 is a partially sectional perspective view showing a power-supply device according to a first embodiment of the present invention.

A first embodiment of a power-supply device 1 according to the present invention will be described below with reference to FIGS. 1 to 6.

The power-supply device 1 is applicable to a sliding door, a sliding seat, or a rotary back door of a vehicle and the like. The power-supply device 1 includes: a synthetic resin made case 2; a guide rail 3 mounted on the case; a slider 4 slidably engageable with the guide rail 3; an urging member 5 mounted on the slider 4; and a long rack 6 for slidably engaging with the urging member 5.

The case 2 is composed of a wide part 2a, and a narrow part 2b extended integrally with the wide part 2a in a longitudinal direction. The case includes a step wall 7 having an opening 8 disposed between the wide part 2a and the narrow part 2b, and a slit 10 through which a projection 9 is projected from the slider 4 and slid forward and backward within a substantially total length of the case 2. The case 2 is enclosed with walls except the opening 8 and the slit 10, and includes an inner room for receiving a wire harness 11 having a plurality of electric wires curved in a substantial U or J-shape.

The wire harness 11 is fixed at the opening 8 in the middle of the case 2, extended in a substantial U or J-shape from the opening 8 to the slider 4, and routed outward from the projection 9 through an interior of the slider 4. The projection 9 of the first embodiment is formed in a plate shape. The wire harness 11 is routed in a flat shape in the slider 4 and banded to have a shape having a substantially circular section in the case 2. Incidentally, the shape of the slider 4 may be modified to pass the wire harness 11 having the substantially circular section. Further, the wire harness 11 may be extended in a flat shape in the case 2.

The slider 4 is made of synthetic resin and has a substantially L-shaped section. Further, the slider 4 is dividable in a direction of thickness for receiving the wire harness 11. The slider 4 includes: the projection 9; a base 12 integrally extended perpendicular to the projection 9; a thick part 13 integrally extended from the base 12; a pair of guides 14 integrally formed with the base 12 in a direction of projecting the projection 9, receiving the urging member 5 slidably back and forth in a longitudinal direction of the case 2, a slidable engaging part 15 for slidably engaging with the guide rail 3 disposed on a wall opposed to the wall having the guides 14 on the base 12.

Figure 2:
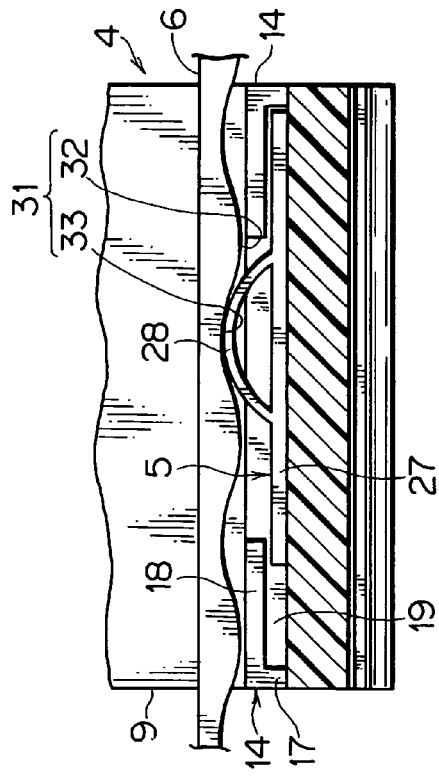
FIG. 2 is a perspective view showing a slider of the power-supply device according to the first embodiment of the present invention.

The wire harness 11 is inserted into the slider 4 from a not-shown opening opened on a sidewall of the thick part 13 of the slider 4 facing a sidewall 16 of the case 2. As shown in FIG. 2, each of the pair of guides 14 is formed in a substantial L-shape with a short supporting wall 17 disposed vertically from the base 12 and a long guiding wall 18 disposed perpendicular to the supporting wall 17 and parallel to the base 12. The guides 14 are symmetrically arranged back and forth. A slit 19 along which the urging member 5 is slid is formed between the lower guiding wall 18 and an upper wall of the base 12.

The slidable engaging part 15 in FIG. 2 is formed to have a substantially T-shaped section with a supporting wall 20 extended downward perpendicularly from a back wall of the base 12 and an engaging wall 21 projected perpendicular to the supporting wall 20 in a direction of thickness of the supporting wall 20. A pair of projected lines 22 for engaging with the guide rail 3 in FIG. 1 without rattle is formed facing each other on the back wall of the base 12 and on a backside of the engaging wall 21.

In FIG. 1, the guide rail 3 is made of synthetic resin or metal, and formed to have a tube shape with a substantially rectangular section. A slit 24 is disposed in the center of an upper wall 23 of the guide rail 3 facing the base 12 of the slider 2. A lower wall 25 disposed between the guide rail 3 opposed to the upper wall 23 is fixed on a bottom wall 26 of the case 2. As shown in FIG. 2, the slidable engaging part 15 is inserted into the slit 24 at the supporting wall 20 thereof. The engaging wall 21 is engaged slidably in the longitudinal direction of the case 2 with a gap inside the guide rail 3.

As shown in FIG. 2, the urging member 5 is preferably made of synthetic resin or the like, and composed of a rectangular-plate base plate 27, a resilient bent plate part 28 formed integrally with the base plate 27 in the longitudinal center of the base plate 27. The resilient part 28 is allowed to be bent inward by deforming the curved shape thereof. When the resilient part is disposed separately from the base plate 27, a metallic plate is acceptable as the urging member 5.

A full length of the base plate 27 of the urging member 5 is formed shorter than that of a gap 19 enclosed by the pair of guides 14. A length of the resilient part 28 of the urging member 5 is formed shorter than that of a center opening 30 between the pair of guides 14. The base plate 27 is inserted into the gap 19, and the resilient part 28 is projected outward through the center opening 30.

As shown in FIG. 2, when one end of the base plate 27 is contacted with the supporting wall 17 of one of the pair of the guides 14, the gap 19 for sliding the urging member 5 relative to the slider 4 is formed between the supporting wall 17 of the other guide 14 and the other end of the base plate 27. In this condition, one end of the resilient part 28 is close to or contacted with the one guide 14, and a gap for sliding the slider 4 is formed between the other end of the resilient part 28 and an inward longitudinal end of the guiding wall 18 of the other guide 14.

The pair of guides 14 is extended from and perpendicular to the vertical projection 9 of the slider 4. For preventing the urging member 5 from moving out of an interior of the pair of guides 14, preferably, the urging member is bent for being inserted into the interior of the pair of guides 14, then a sidewall of the base plate 27 is contacted with a side end 13b of the thick part 13. Otherwise preferably, the sidewall of the base plate 27 is contacted with a resilient hook (not shown) projected downward vertically from the guiding walls 18 of the guides 14.

Figure 3:
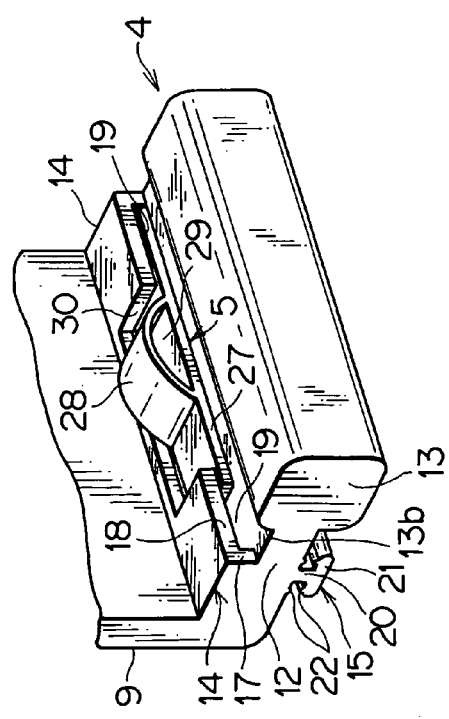
FIG. 3 is a partially sectional front view showing an engagement between an urging member of the slider and a rack according to the first embodiment of the present invention.

As shown in FIG. 1, preferably, the rack 6 is made of synthetic resin or the like, and includes a wavy part 31 over the entire length thereof. The wavy part 31 is composed of a plurality of crests 32 and troughs 33 disposed alternately. As shown in FIG. 3, a bending radius of the troughs 33 is substantially equal to that of the crests 32, and larger than that of the resilient part 28 of the urging member 5.

As shown in FIGS. 1 and 3, the arc-shaped resilient part 28 of the urging member 5 is resiliently engaged with one of the curved troughs 33 without rattle. Further, the slidable engaging part 15 of the slider 4 is engaged with the guide rail 3 of the case 2 without rattle. Further, the base 12 and the projection 9 disposed at the other side of the slider 4 opposite the guide rail 3 are prevented from interfering with the case 2. Thereby, a noise is prevented. Counter force of the resilient part 28 presses the slidable engaging part 15 against the lower wall 25 of the guide rail 3. The resilient part 28 is resiliently contacted with one of the troughs 33 of the rack 6.

Because the resilient part 28 is engaged with one of the troughs 33, the slider 4 is temporarily fixed with relatively weak force. Therefore, unintentional movement of the slider 4 in the longitudinal direction of the case 2 is regulated. In this condition, the slider 4 is only movable relative to the rack 6 within lengths of the gaps 19 formed between the pair of guides and the base plate 27. Although the slider 4 is movable within the gaps 19, because the slider 4 is engaged with the guide rail 3 by the slidable engaging part 15, frictional force between the slidable engaging part 15 and the guide rail 3 prevents the rattle of the slider 4 in the longitudinal direction of the case 2.

Incidentally, when the urging member 5 is firmly fixed to the guides 14, or integrally formed with the slider 4, the engagement between the resilient part 28 and one of the troughs 33 temporarily and completely regulates the movement of the slider 4 in the longitudinal direction of the rack 6.

From a condition shown in FIGS. 1 to 3, pushing the slider 4 against the resilient force of the urging member 5 makes the slider 4 movable in the longitudinal direction of the case 2 along the guide rail 3. As shown in FIG. 3, while a top of the resilient part 28 is contacted with a deepest part of one of the troughs 33, the resilient part 28 presses upward the deepest part of the trough 33.

Figure 4:
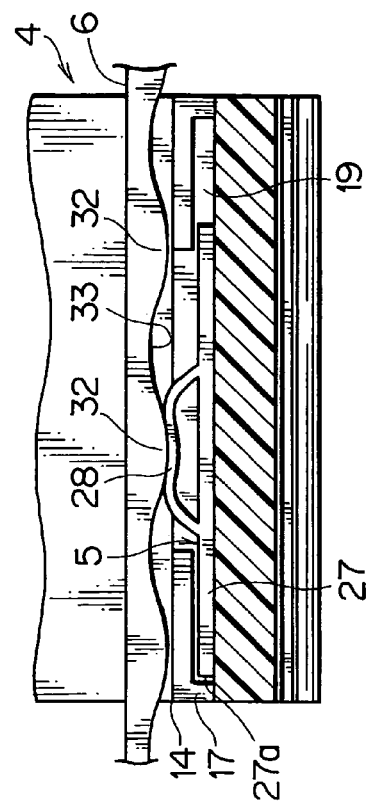
FIG. 4 is a perspective view showing a deformed urging member according to the first embodiment of the present invention.
Figure 5:
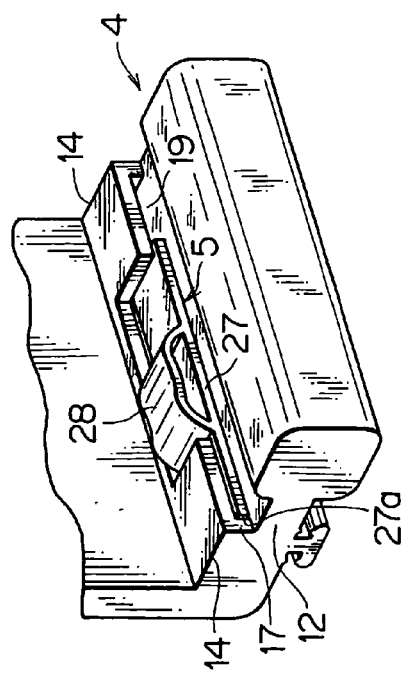
FIG. 5 is a partially sectional front view showing a movement of the urging member relative to the rack according to the first embodiment of the present invention.

As shown in FIGS. 4 and 5, when the slider 4 is slid toward a right side of FIGS. 2 and 3, firstly, the urging member 5 is not moved while the slider is slid. Then, after a sidewall 27a at an end of the base plate 27 of the urging member 5 is contacted with the supporting wall 17 of one of the guides 14 of the slider 4, the urging member 5 is moved integrally with the slider 4. Accordingly, the resilient part 28 is moved over the crests 32 and down the troughs 33 of the rack 6 one by one.

FIGS. 4 and 5 show the urging member 5 moved to the top of one of the crests 32 of the rack 6. As shown in FIG. 5, though it is a rare case, when the top of the resilient part 28 is positioned on the top of the crest 32, the urging member 5 is held at the position. However, mostly owing to inertia force of the slider 4, when the top of the resilient part 28 is displaced even a little from the top of the crest 32 to the gap 19 of FIG. 4 (to the right of FIG. 2), the resilient part 28 is resiliently deformed in the longitudinal direction of the case 2, and moved to the trough 33 at the right side of the resilient part 28. Consequently, the base plate 27 is moved toward the gap 19. Therefore, the resilient part 28 is deformed a little, and for a short time. Thereby, permanent deformation of the resilient part 28 is prevented and resiliency of the resilient part 28 is maintained for a long time.

Incidentally, even when the rack 6 having no crests 32 is used, resilient contact pressure between the resilient part 28 of the urging member 5 and the rack 6 prevents the rattle of the slider 4 in a direction of thickness of the case 2 and the noise caused by the rattle. However, the slider 4 is no longer temporarily engaged with one of the troughs 33.

The horizontal power-supply device 1 shown in FIG. 1 is used for, for example, a sliding seat of a vehicle. The vertical power-supply device 1 is used for, for example, a sliding door of a vehicle. In the sliding seat, the case 2 is disposed horizontally on a floor panel of the vehicle. Further, the wire harness 11 routed out of the upward projection 9 of the slider 4 is connected to a motor in the sliding seat. The wire harness 11 routed out of the opening 8 of the case 2 is connected to a battery.

In the sliding door, the case 2 is disposed vertically on the sliding door. Further, the wire harness 11 routed out of the horizontal projection 9 of the slider 4 is routed in a vehicle body through a connecting path between the sliding door and the vehicle body. The wire harness 11 routed out of the opening 8 of the case 2 is connected to the auxiliaries and the like at the sliding door. Otherwise, the case 2 is disposed vertically in the vehicle body, and the wire harness 11 routed out of the horizontal projection 9 is wired in the sliding door through the connecting path, and connected to the auxiliaries and the like at the sliding door. The wire harness 11 routed out of the opening 8 of the case 2 is connected to a battery installed on the vehicle body.

Second Embodiment

A second embodiment of a power-supply device 1 according to the present invention will be described below with reference to FIGS. 7 to 9.

Figure 7:
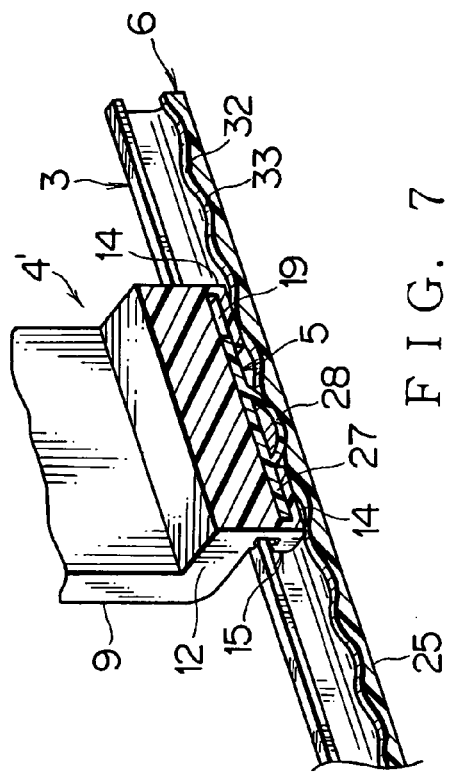
FIG. 7 is a partially sectional perspective view showing an engagement between an urging member of a slider and a rack according to the second embodiment of the present invention.
Figure 8:
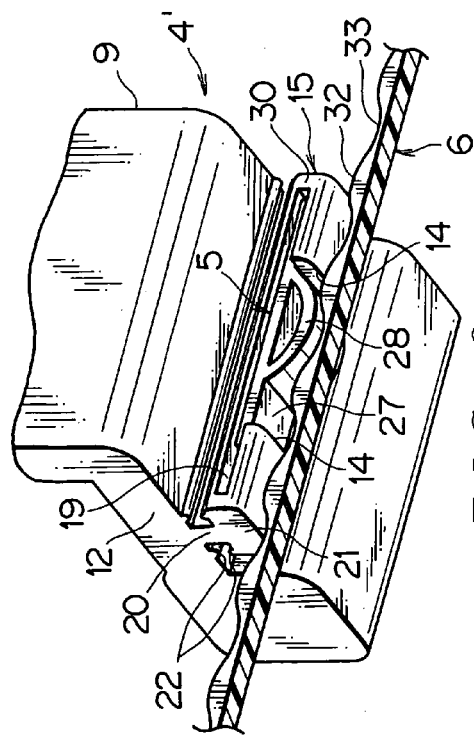
FIG. 8 is a partially sectional bottom perspective view showing an engagement between the urging member of the slider and the rack according to the second embodiment of the present invention.
Figure 9:
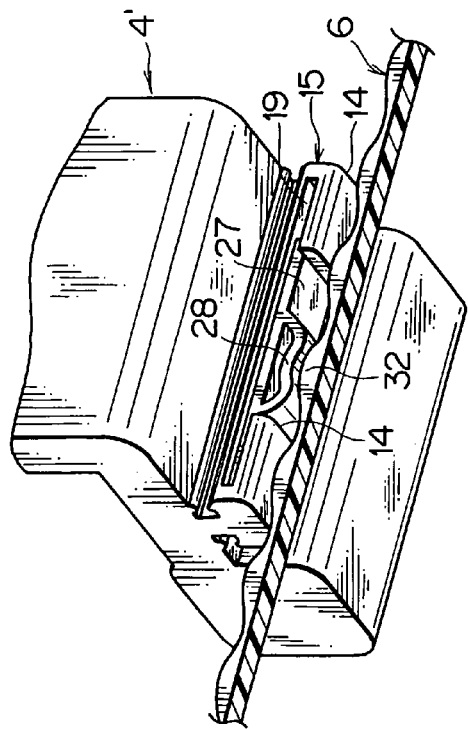
FIG. 9 is a partially sectional perspective view showing a movement of the urging member relative to the rack according to the second embodiment of the present invention.
Figure 10:
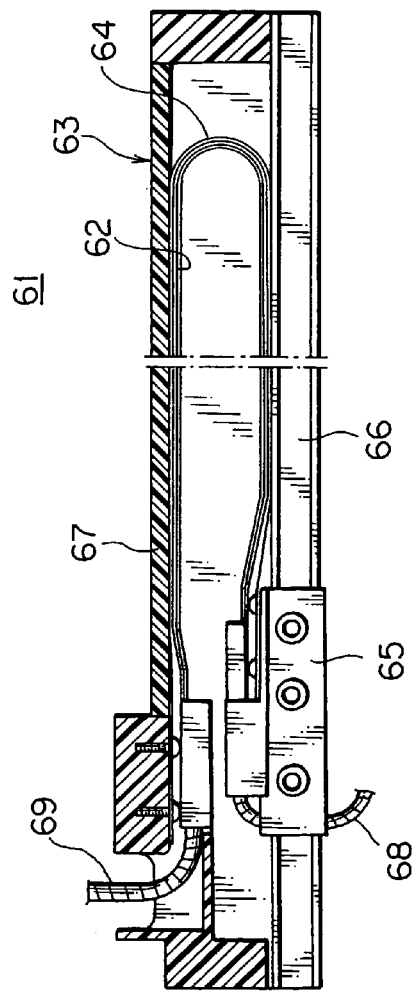
FIG. 10 is a vertically sectional view showing one embodiment of a conventional power-supply device.

As shown in FIGS. 7 to 9, the rack 6 of the power-supply device 1' is disposed between the guide rail 3 of the case 2. Accordingly, the urging member 5 is disposed on the opposite side of the slider 4' from that of the first embodiment. Identical reference numbers will designate identical elements and only the difference existing in comparison with the first embodiment will be explained.

Figure 6:
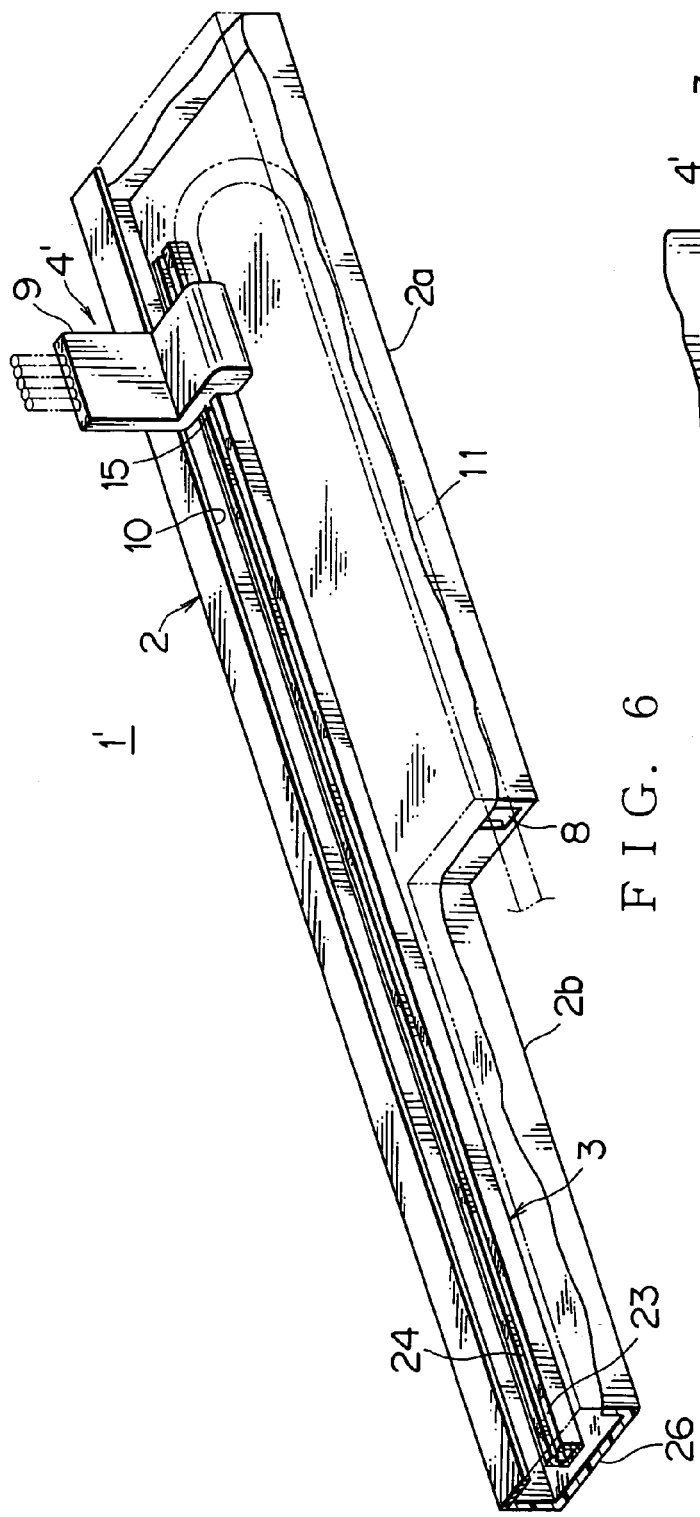
FIG. 6 is a partially sectional perspective view showing a power-supply device according to a second embodiment of the present invention.

As shown in FIG. 6, the slidable engaging part 15 of the slider 4' is slidably engaged through the slit 24 with the guide rail 3 having the substantially rectangular section. As shown in FIGS. 7 to 9, the resilient part 28 of the urging member 5 of the slidable engaging part 15 is resiliently and slidably engaged with the rack 6 inside the guide rail 3.

The slidable engaging part 15 of the second embodiment integrally includes the pair of guides 14 disposed back and forth in the longitudinal direction of the case 2. The base plate 27 of the urging member 5 is slidably engaged with the gap 19 of the guides 14. The rack 6, the resilient part 28 and the like are disposed on the opposite side from those of the first embodiment in figures. The rack 6 is fixed to an inner wall of the lower wall 25 (FIG. 7) of the guide rail 3. The guide rail 3 is fixed to an inner wall of the bottom wall 26 of the case 2 (FIG. 6).

The slidable engaging part 15 is composed of the supporting wall 20 extended downward from the base 12 of the slider 4 and the engaging wall 21 perpendicular to the supporting wall 20. The engaging wall 21 includes the guides 14 disposed back and forth in the longitudinal direction of the case 2, the opening 30 notched between the guides 14. The opening 30 communicates with the slit-shaped gap 19 inside the engaging wall 21. The base plate 27 of the urging member 5 is slidably engaged with the gap 19, and the resilient part 28 is projected toward the rack 6 through the opening 30. The pair of projected lines 22 for engaging with the guiding rail 3 without rattle is formed facing each other on the base 12 and on the engaging wall 21.

As shown in FIGS. 7 and 8, the resilient part 28 is resiliently engaged with one of the troughs 33 of the rack 6. As shown in FIG. 9, the resilient part 28 is resiliently deformed and moved over one of the crests 32. The base plate 27 is movable in the longitudinal direction of the case 2 in between the pair of guides 14 within a length of the gap 19.

As shown in FIG. 6, the wire harness 11 is routed in a substantial U-shape in the case 2 from the opening 8, and routed outside from the projection 9 through the slider 4'.

When the resilient part 28 of the urging member 5 is engaged with one of the troughs 33 of the rack 6, or moved along the troughs 33 and the crests 32, the slidable engaging part 15 of the slider 4' is pressed against the inner wall of the wall 23 of the guide rail 3 due to the counter force of the resilient part 28, thereby the rattle of the slider 4', the noise and the abrasion caused by the rattle are prevented. Further, while the resilient part 28 is engaged with one of the troughs 33 of the rack 6, the slider 4' is resiliently and temporarily fixed to be positioned.

According to the power-supply device 1' shown in FIG. 6, because the rack 6 is disposed inside the guide rail 3, and the urging member 5 is disposed inside the slidable engaging part 15, a structure of the power-supply device 1' can be slim and compact.

Incidentally, according to the first and the second embodiments of the present invention, the case 2 may have a wide part 2a without a step throughout a length thereof. In this condition, the opening 8 for routing out the wire harness 11 is disposed at the end or the center of the case 2. Further, the projection 9 of the sliders 4, 4' may be formed so short as to be positioned in the slit 10 of the case 2. Further, the section of the guide rail 3 is not limited to be the substantially rectangular section, and may be a symmetrical pair of substantially L-shaped sections, or a substantially L-shaped section. The shape of the slidable engaging part 15 may be modified corresponding to the shape of the guide rail 3.

Further, according to the embodiments of the present invention, the resilient part 28 of the urging member 5 is formed in a bent plate having a space under the plate, however, may be formed in a semi-circular column shape by cellular porous material such as urethane, or rubber. Further, according to the embodiments of the present invention, the shape of the rack 6 is formed in a corrugated part having a smoothly curved wavy section, however, may be formed, for example, a corrugated part having a triangular section. The resilient part 28 also may be formed in a triangular, a semi-circular, a hemisphere shape, or the like corresponding to the shape of the rack 6.

Further, according to the embodiments of the present invention, the urging member 5 is slidably engaged with the slider 4 or 4', however, the urging member 5 may be fixed to the slider 4, 4' or be molded integrally with the slider 4, 4'. In this condition, for example, the base plate 27 of the urging member 5 may be canceled, and the urging member 5 may be composed of a fixed part (not shown) to the slider 4, 4' and the resilient part 28 extending from the fixed part. Thus, the urging member 5 may be modified accordingly.

According to the present invention, because the rattle, noise, abrasion of the slider 4 or 4' are prevented, product quality and product value of the power-supply device 1 or 1' are increased. Further, because the rattle of the slider 4, 4' is prevented, each component of the power-supply device 1 or 1' has a large tolerance of size. Accordingly, for example, even when the larger case 2 made of synthetic resin is used, and thereby a variation of a molding size of the case 2 is increased, the increased variation is accepted. Therefore, a production cost of each component of the power-supply device 1, 1' is reduced. Further, because a position of the slider 4, 4' is constantly regulated before mounting the power-supply device 1 on a vehicle or the like, workability for mounting the power-supply device 1, 1' on the vehicle or the like is increased.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein

What is claimed is:

1. A power-supply device comprising:
   a case receiving a curved wire harness;
   a guide rail mounted on the case;
   a slider mounted slidably on the guide rail, through which the wire harness is routed out from the case;
   an urging member having a resilient part mounted on the slider; and
   a long rack alternately having crests and troughs slidably engaged with the resilient part of the urging member.

2. The power-supply device as claimed in claim 1, wherein the long rack is mounted on the guide rail, and the urging member is mounted on a slidable engaging part of the slider for engaging with the guide rail.

3. The power-supply device as claimed in claim 1, wherein the urging member is slidably engaged with the slider.

4. The power-supply device as claimed in claim 3, wherein the urging member includes a base plate and the resilient part mounted on the base plate, and the slider includes a pair of guides,
   wherein said base plate is slidably engaged with a gap between the pair of guides of the slider.

5. The power-supply device as claimed in claim 1, wherein the resilient part is formed in a bent plate shape.

6. The power-supply device as claimed in claim 1, wherein the crests and the troughs form a corrugated part of the rack.

* * * * *